(12) United States Patent
Kim et al.

(10) Patent No.: US 7,772,776 B2
(45) Date of Patent: Aug. 10, 2010

(54) DISPLAY DEVICE WITH PANEL AND CHASSIS BASE ALIGNED

(75) Inventors: Myoung-Kon Kim, Suwon-si (KR); Tae-Kyoung Kang, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 31 days.

(21) Appl. No.: 10/951,961

(22) Filed: Sep. 27, 2004

(65) Prior Publication Data

US 2005/0078430 A1 Apr. 14, 2005

(30) Foreign Application Priority Data

Oct. 9, 2003 (KR) ...................... 10-2003-0070209

(51) Int. Cl.
*H01J 17/49* (2006.01)
(52) U.S. Cl. ..................... 313/587; 313/582
(58) Field of Classification Search ................. 361/681; 313/582–587; 315/169.4; 345/37, 41, 60
See application file for complete search history.

(56) References Cited

U.S. PATENT DOCUMENTS

| | | | |
|---|---|---|---|
| 4,089,045 A * | 5/1978 | Mars | 362/390 |
| 5,771,085 A | 6/1998 | Ochi et al. | |
| 5,946,061 A * | 8/1999 | Kurihara et al. | 349/58 |
| 6,061,231 A * | 5/2000 | Crockett | 361/681 |
| 6,288,489 B1 * | 9/2001 | Isohata et al. | 313/582 |
| 6,433,489 B1 | 8/2002 | Tanaka et al. | |
| 6,501,641 B1 * | 12/2002 | Kim et al. | 361/681 |
| 6,688,576 B2 * | 2/2004 | Oishi et al. | 248/317 |
| 6,856,076 B2 | 2/2005 | Kim et al. | |
| 6,885,427 B2 | 4/2005 | Lee et al. | |
| 7,002,792 B2 * | 2/2006 | Han et al. | 361/681 |
| 2006/0098398 A1 * | 5/2006 | Kim | 361/681 |

FOREIGN PATENT DOCUMENTS

CN 1161519 A 10/1997

(Continued)

OTHER PUBLICATIONS

Korean Patent Abstracts for Publication number: 1020030029697; Date of publication of application Apr. 16, 2003 in the name of Yeon H. Jung.

(Continued)

*Primary Examiner*—Nimeshkumar D. Patel
*Assistant Examiner*—Christopher M Raabe
(74) *Attorney, Agent, or Firm*—Christie, Parker & Hale, LLP (57) ABSTRACT

A display device is provided having enhanced precision and accuracy in attachment of a plasma display panel to a chassis base. A method and apparatus for manufacturing such a display device is also provided. The display device may include a display panel having an upper panel and a lower panel and a chassis base for supporting the display panel. At least one panel of upper and lower panels in a plasma display panel is marked with an aligning mark, and a penetration hole is formed at a chassis base at a position corresponding to the aligning mark. Therefore, the chassis base and the plasma display panel may be precisely aligned on the basis of the aligning mark exposed through the penetration hole.

22 Claims, 6 Drawing Sheets

FOREIGN PATENT DOCUMENTS

| | | |
|---|---|---|
| CN | 1373859 A | 10/2002 |
| CN | 1412810 A | 4/2003 |
| CN | 1447167 A | 10/2003 |
| JP | 11101963 A * | 4/1999 |
| JP | 2000-164655 | 6/2000 |
| JP | 2001-84896 | 3/2001 |
| JP | 2002202729 A * | 7/2002 |
| JP | 2002-265040 | 9/2002 |
| JP | 2003215527 A * | 7/2003 |
| KR | 2001-0043102 | 5/2001 |
| KR | 2003-0029697 | 4/2003 |
| WO | WO 01/07959 A2 | 2/2001 |

OTHER PUBLICATIONS

Patent Abstracts of Japan for Publication No. 2001-084896; Date of publication of application Mar. 30, 2001, in the name of T. Okada et al.

* cited by examiner

DISPLAY DEVICE WITH PANEL AND CHASSIS BASE ALIGNED

CROSS-REFERENCE TO RELATED APPLICATION

This application claims priority to and the benefit of Korean Patent Application No. 2003-70209, filed on Oct. 9, 2003 in the Korean Intellectual Property Office, the entire content of which is incorporated herein by reference.

FIELD OF THE INVENTION

Generally, the present invention relates to a display device. More particularly, the present invention relates to a plasma display device having enhanced precision in the attachment of a plasma display panel to a chassis base and a method and apparatus for manufacturing such a plasma display device.

BACKGROUND OF THE INVENTION

One common display device is a plasma display device. As is well known in the prior art, a plasma display device displays a desired image using plasma discharge. Such a plasma display device generally includes a plasma display panel (PDP) for displaying the desired image through plasma discharge activated by an external power source, a chassis base for firmly holding the PDP at its front side, and one or more circuit boards mounted on a rear side of the chassis base for driving the PDP.

The PDP needs to be precisely positioned with respect to the chassis base in order to be attached thereto. When an attachment position of the PDP to the chassis base is not precisely controlled, an image display region in a plasma display device may deviate from a designed position so that the product quality of the plasma display device is deteriorated.

According to the prior art, an attachment position of the PDP to the chassis base is controlled on the basis of exterior circumferences of the PDP and the chassis base. That is, the PDP and the chassis base are first aligned such that the exterior circumference of the PDP and the exterior circumference of the chassis base correspond, and then the two components are attached to each other.

However, such aligning of the PDP and the chassis base only provides a limited scope of precision in controlling attachment position, and a tool and/or criteria for precisely determining whether the PDP has been attached to an accurate position on the chassis base has not yet been well established.

Therefore, more precise controlling of aligning a PDP and a chassis base and accordingly attaching the PDP and the chassis base more accurately may result in an enhancement of product quality of a plasma display device.

In addition, determining how to accurately attach a PDP and a chassis base before they are fully manufactured may help reduce the percentage of inferior products of finalized plasma display devices.

SUMMARY OF THE INVENTION

A display device is provided having enhanced precision and accuracy in attachment of a plasma display panel to a chassis base. A method and apparatus for manufacturing such a display device is also provided.

An exemplary plasma display device according to an embodiment of the present invention includes a PDP comprising upper and lower panels, at least one panel of the upper and lower panels being marked with at least one aligning mark; and a chassis base for supporting the PDP, the chassis base comprising at least one penetration hole, the chassis base exposing at least part of the at least one aligning mark through the at least one penetration hole.

In a further embodiment, the at least one aligning mark and the at least one penetration hole are respectively provided as pluralities.

In another further embodiment, the at least one penetration hole and the at least one aligning mark are circular.

In another further embodiment, the at least one penetration hole is larger than the at least one aligning mark. In this case, in a further embodiment, the chassis base exposes entirely the at least one aligning mark through the at least one penetration hole.

In another further embodiment, aligning marks respectively marked at the upper and lower panels for alignment thereof are also used for an alignment of the PDP and the chassis base. That is, the upper panel is marked with at least one upper aligning mark, the lower panel is marked with at least one lower aligning mark, and the upper and lower panels are adhered such that the upper and lower aligning marks coincide.

An exemplary method for manufacturing a plasma display device according to an embodiment of the present invention includes marking at least one aligning mark at at least one panel of upper and lower panels, forming a PDP by adhering the upper and lower panels, forming at least one penetration hole at a chassis base, aligning the PDP and the chassis base such that at least part of the at least one aligning mark is visibly exposed through the at least one penetration hole, and combining the PDP and the chassis base at their aligned positions.

In a further embodiment, the at least one aligning mark is formed as a plurality in the marking thereof, and the at least one penetration hole is formed as a plurality in the forming thereof.

In another further embodiment, the forming of the at least one penetration hole forms the at least one penetration hole larger than the at least one aligning mark, and the aligning of the PDP and the chassis base aligns the PDP and the chassis base such that the at least one aligning mark is entirely exposed through the at least one penetration hole.

In another further embodiment, the at least one penetration hole and the at least one aligning mark are circular.

In another further embodiment, the marking of at least one aligning mark respectively marks at least one upper aligning mark at the upper panel and at least one lower aligning mark at the lower panel, and the forming of the PDP adheres the upper and lower panels after aligning them using the upper and lower aligning marks.

An exemplary apparatus for manufacturing such a plasma display device according to an embodiment of the present invention includes a PDP holder for holding the PDP, a chassis base holder for holding the chassis base, an optical sensor for detecting the at least one aligning mark through the at least one penetration hole of the chassis base, a motor for moving at least one holder of the chassis base holder and the PDP holder, and an electronic control unit for receiving a detection signal from the optical sensor and for controlling the motor based thereon. The electronic control unit executes instructions for moving the at least one holder to a predetermined position, determining whether the at least one aligning mark is detected through the at least one penetration hole, and adjusting, when the at least one aligning mark is detected, a position of the at least one holder such that the at least one aligning mark becomes positioned at a predetermined position relative to the at least one penetration hole.

In a further embodiment, the adjusting of the position of the at least one holder includes determining whether the at least one aligning mark is entirely exposed through the at least one penetration hole, and positioning the at least one holder to a position at which the at least one aligning mark is entirely exposed through the at least one penetration hole.

DETAILED DESCRIPTION

Figure 1:
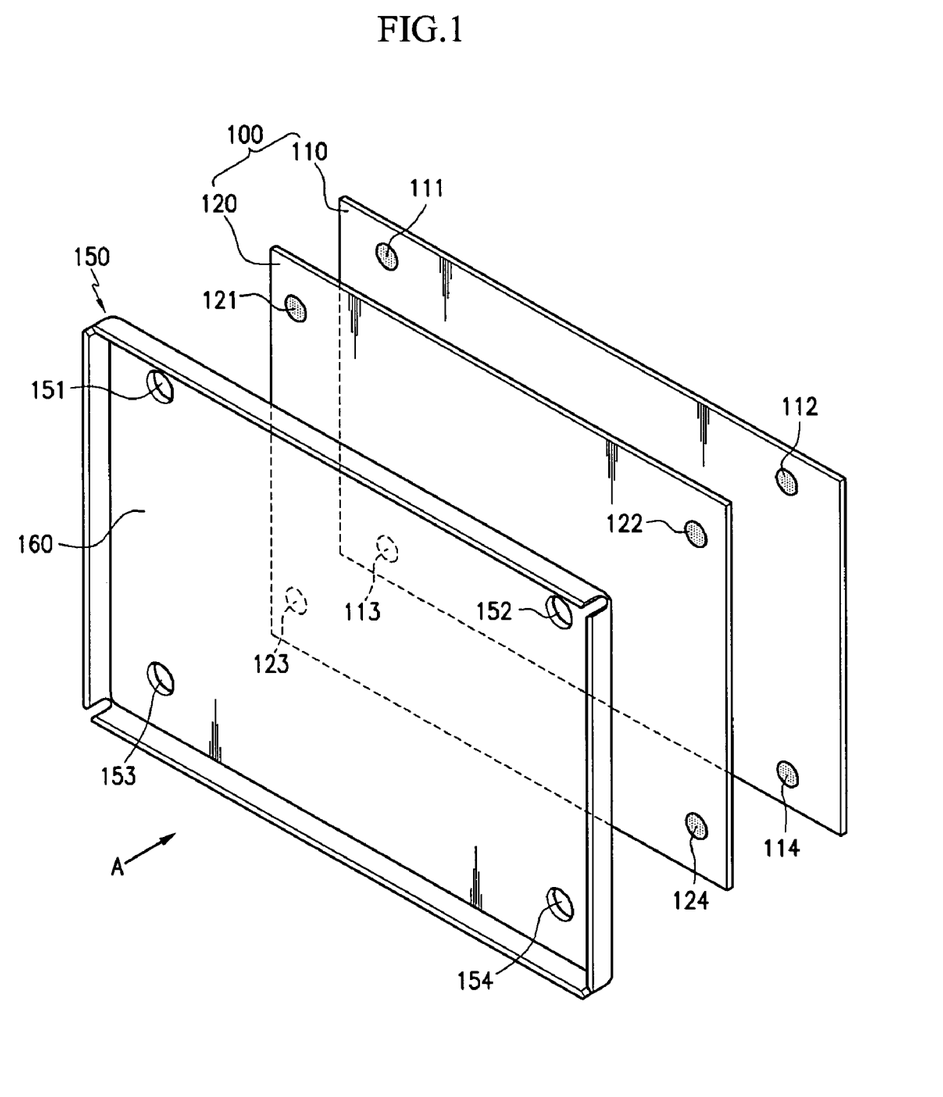
FIG. 1 is an exploded perspective view of a plasma display device according to an embodiment of the present invention.

As shown in FIG. 1, a plasma display device according to an embodiment of the present invention includes a plasma display panel (PDP) 100 and a chassis base 150 for supporting the PDP 100.

The PDP 100 may include an upper panel 110 and a lower panel 120. At least one aligning mark may be marked on either or both of the upper and lower panels 110 and 120. According to an embodiment of the present invention, the upper panel 110 and the lower panel 120 respectively may be marked with aligning marks 111-114 and 121-124.

The aligning marks 111-114 and 121-124 are not necessarily spatially formed, but they may be optically distinguishable from the chassis base 150 and material surrounding the panels 110 and 120.

According to an embodiment of the present invention, the aligning marks 111-114 and 121-124 are formed at each corner of the upper and the lower panels 110 and 120. However the scope of the present invention should not be limited to placing the aligning marks in these positions.

The upper aligning marks 111-114 of the upper panel 110 and the lower aligning marks 121-124 of the lower panel 120 may be formed at corresponding positions. Therefore, the upper and lower panels 110 and 120 are adhered to form the PDP 100 in such a manner that corresponding pairs of aligning marks 111 and 121, 112 and 122, 113 and 123, and 114 and 124 coincide.

The penetration holes 151-154 may be formed at the chassis base 150 on a side 160 to which the PDP 100 is attached. It will be apparent to a person of ordinary skill in the art that forming such penetration holes 151-154 at the chassis base 150 does not necessarily require additional steps to form the chassis base 150.

In one exemplary embodiment, there may be as many penetration holes 151-154 as aligning marks 111-114 and 121-124 of the upper and lower panels 110 and 120, and the positions of the penetration holes 151-154 may correspond to the positions of the aligning marks 111-114 and 121-124.

Therefore, when the PDP 100 is attached to the chassis base 150, each pair of corresponding aligning marks 111 and 121, 112 and 122, 113 and 123, and 114 and 124 may be visible through each of penetration holes 151-154

FIG. 1 illustrates that each of the upper and the lower panels 110 and 120 is marked with four aligning marks at the corners of the panels and, accordingly, four penetration holes are formed at the chassis base 150 at positions corresponding thereto. However, as has been noted above, the present invention should not be limited to positioning the aligning marks and penetration holes at these particular locations.

For example, the PDP 100 and the chassis base 150 may be aligned wherein only one panel of the upper and the lower panels 110 and 120 is marked with only one aligning mark, and only one penetration hole is formed on the chassis base at a position corresponding to the aligning mark.

However, having a plurality of aligning marks 111-114 and 121-124 and penetration holes 151-154 may enable more accurate rotational alignment of the chassis base 150 and PDP 100.

Figure 2:
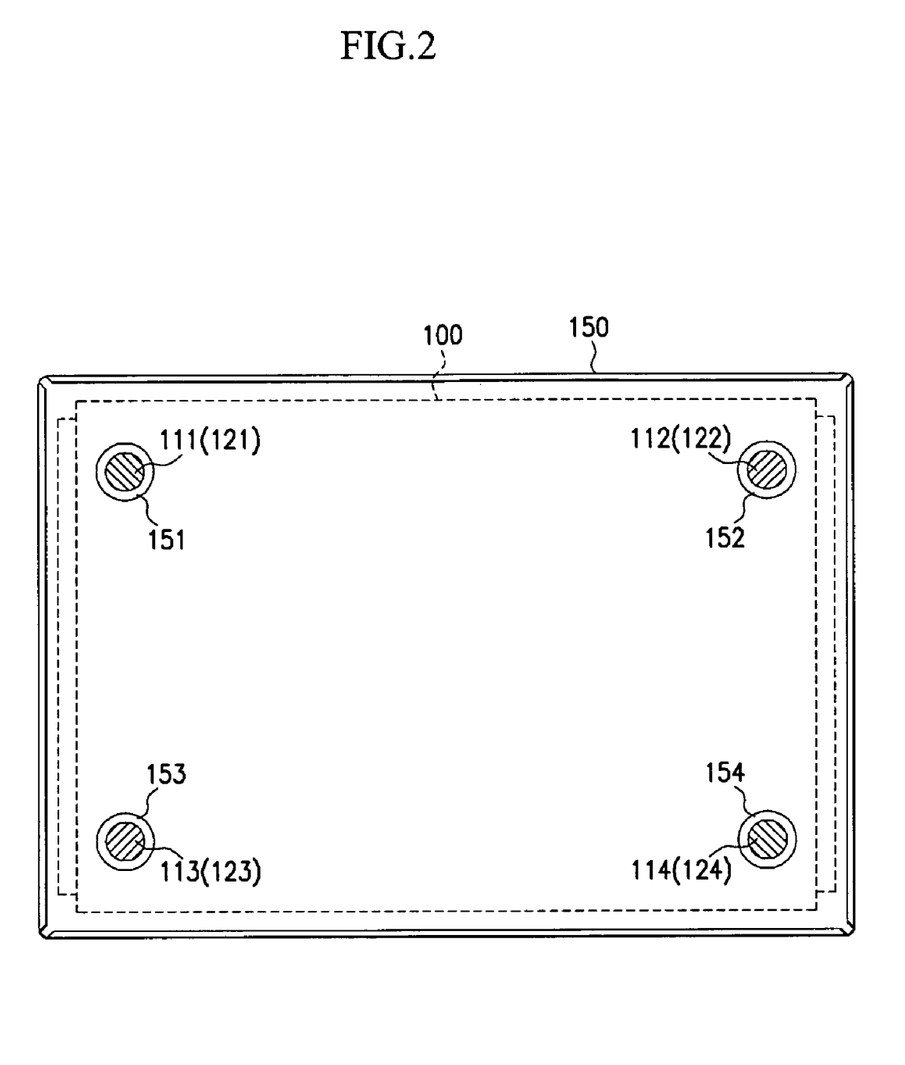
FIG. 2 is a view of a plasma display device seen in a direction A of FIG. 1 according to an embodiment of the present invention, and illustrates how a PDP and a chassis base are aligned in a plasma display device.

FIG. 2 is a view of a plasma display device seen in a direction A of FIG. 1 according to an embodiment of the present invention, and illustrates how a PDP 100 and a chassis base 150 are aligned in a plasma display device. In FIG. 2, the penetration holes 151-154 and the aligning marks 111-114 and 121-124 are somewhat exaggeratedly shown for better understanding of the embodiment.

As shown in FIG. 2, the penetration holes 151-154 of the chassis base 150 and the aligning marks 111-114 and 121-124 of the PDP 100 may be circularly shaped. Due to their circular shapes, misalignment in any direction is easily detectable.

In addition, the penetration holes 151-154 may be larger than the aligning marks 111-114 and 121-124 by an allowable error limit. For example, if a diameter of the aligning mark is 3 mm and the allowable error limit is set at 1 mm, a diameter of the penetration holes may be set at 5 mm.

According to an embodiment of the present invention, an aligning criterion of the PDP 100 and the chassis base 150 may be set such that centers of the penetration holes 151-154 coincide with centers of aligning marks 111-114 and 121-124. Therefore, it will be easy to determine whether the aligning criterion is satisfied within the allowable error limit based on whether the aligning marks 111-114 and 121-124 are entirely exposed through the penetration holes 151-154.

As described above, the penetration holes 151-154 may be larger than the aligning marks 111-114 and 121-124, and the aligning marks 111-114 and 121-124 may be entirely exposed through the penetration holes 151-154. However, the scope of the present invention should be understood to encompass any alignment of a PDP and a chassis base using a penetration hole and an aligning mark.

For example, when diameters of the penetration holes 151-154 and the aligning marks 111-114 and 121-124 are smaller than an allowable error limit, partial exposure of the aligning marks 111-114 and 121-124 through the penetration holes 151-154 also ensures that an error of relative position between the chassis base 150 and the PDP 100 lies within the allowable error limit.

Figure 3:
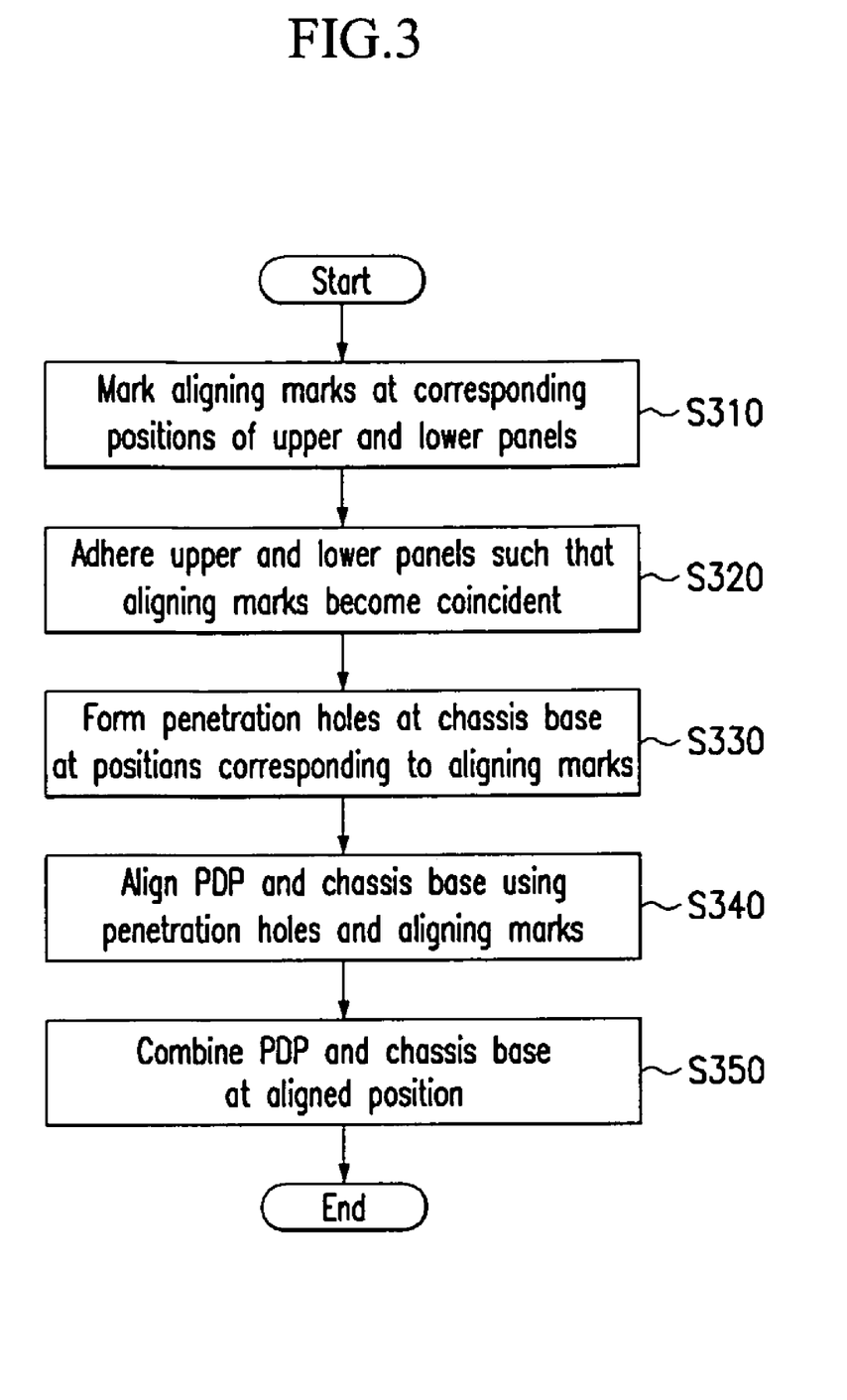
FIG. 3 is a flowchart showing a method for manufacturing a plasma display device according to an embodiment of the present invention.

A method for manufacturing a plasma display device according to an embodiment of the present invention is hereinafter described in detail with reference to FIG. 3.

At step S310, aligning marks 111-114 and 121-124 respectively may be marked at upper and lower panels 110 and 120 at corresponding positions. At step S310, as described above, each of the upper and lower panels 110 and 120 may be marked with a plurality of (e.g., four) aligning marks 111-114 and 121-124.

At step S320, the upper and lower panels 110 and 120 having the aligning marks 111-114 and 121-124 may be aligned such that the aligning marks 111-114 and 121-124 coincide. Then the upper and the lower panels 110 and 120 may be adhered to form the PDP 100.

At step S330, penetration holes 151-154 may be formed at the chassis base 150 at positions corresponding to the aligning marks 111-114 and 121-124. 124. The penetration holes 151-154 may be formed in a manufacturing process (e.g., in a pressing process) of the chassis base 150 without requiring an additional process for forming such holes. As described above, the penetration holes 151-154 may be larger than the aligning marks 111-114 and 121-124.

When the chassis base 150 and the PDP 100 are prepared as such, the PDP 100 and the chassis base 150 are aligned at step S340 such that at least part of the aligning marks 111-114 and 121-124 are visible through the penetration holes 151-154. In more detail, at the step S340, the PDP 100 and the chassis base 150 may be aligned such that the aligning marks 111-114 and 121-124 are entirely exposed through the penetration holes 151-154.

At step S350, the PDP 100 and the chassis base 150 are combined at their aligned positions.

Figure 4:
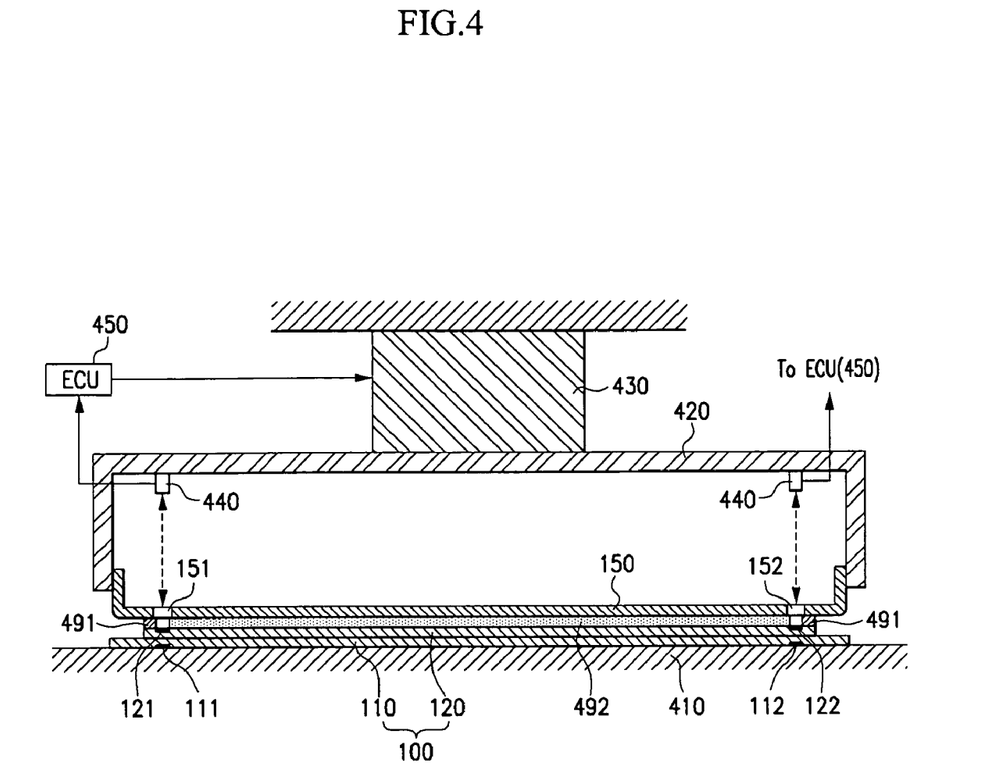
FIG. 4 illustrates an apparatus for manufacturing a plasma display device according to an embodiment of the present invention.

An embodiment of an apparatus for manufacturing a plasma display device is hereinafter described in detail with reference to FIG. 4. As shown in FIG. 4, an apparatus for manufacturing a plasma display device according to an embodiment of the present invention may include a PDP holder 410 for holding the PDP 100, a chassis base holder 420 for holding the chassis base 150, and an optical sensor 440 for detecting the aligning marks 111-114 and 121-124 through the penetration holes 151-154 of the chassis base 150.

The optical sensor 440 may be any sensor that can radiate light of a predetermined wavelength and detect reflected light thereof.

In addition, an apparatus for manufacturing a plasma display device according to an embodiment of the present invention may further include a motor 430 for moving at least one holder of the chassis base holder 420 and the PDP holder 410. For example, FIG. 4 illustrates a motor 430 which moves the chassis base holder 420.

Details for moving a position of the chassis base holder 420 by a motor 430 will be apparent to a person of ordinary skill in the art. The PDP holder 410 may be, for example, as a conveyer belt as is common in a production line of a plasma display device.

As shown in FIG. 4, and as will be apparent to a person of ordinary skill in the art, the PDP 100 and the chassis base 150 may be combined via an adhesive tape 491. Additionally a heat conducting medium 492 for transferring heat from the PDP 100 to the chassis base 150 may be interposed between the PDP and the chassis base.

In addition, an apparatus for manufacturing a plasma display device according to an embodiment of the present invention further includes an electronic control unit (ECU) 450 for receiving a detection signal from the optical sensor 440 and for controlling the motor 430 based thereon.

The ECU 450 may include one or more processors activated by a predetermined program, such predetermined program programmed to perform each step of a method according to an embodiment of this invention.

Figure 5:
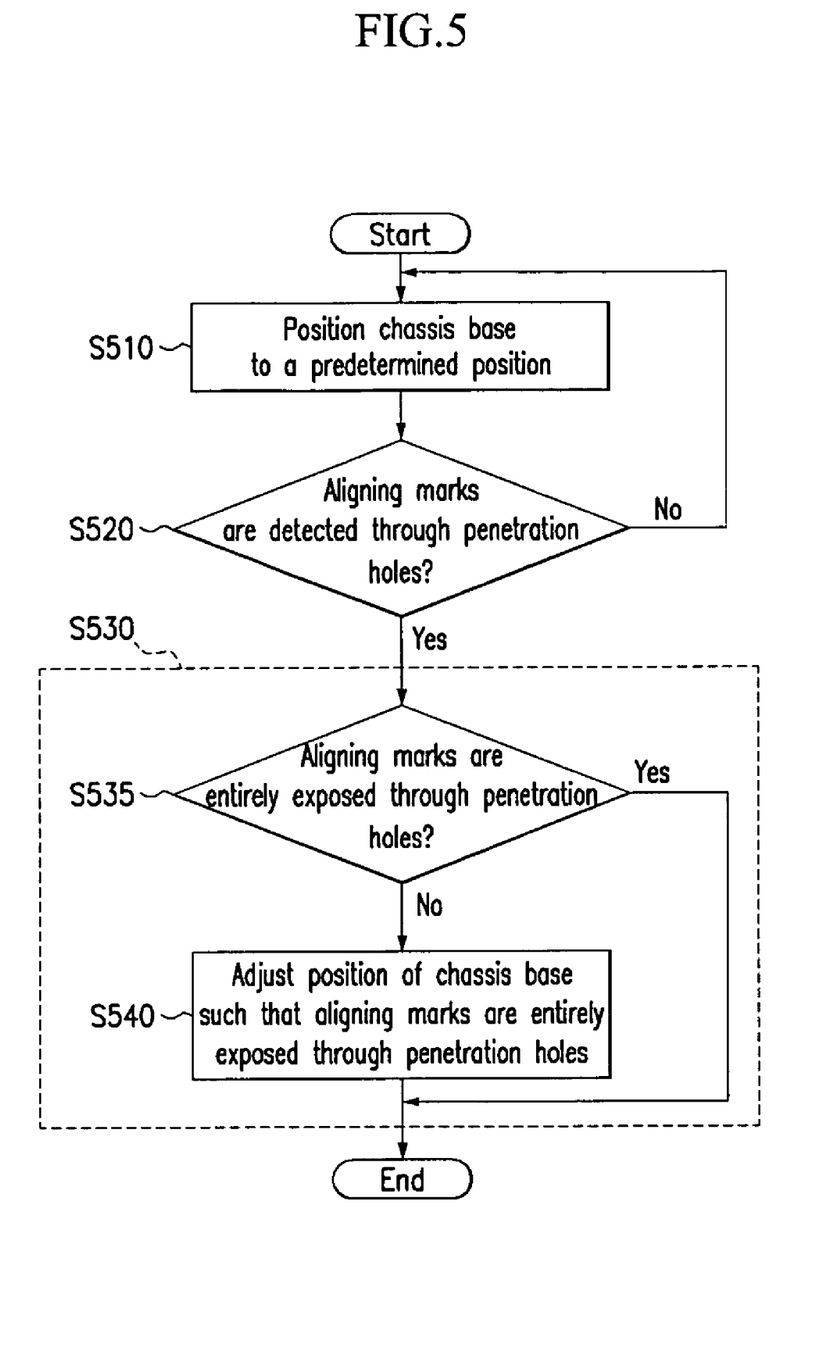
FIG. 5 is a flowchart showing steps executed by an electronic control unit employed in an apparatus for manufacturing a plasma display device according to an embodiment of the present invention.

FIG. 5 is a flowchart showing steps executed by the ECU 450 employed in an apparatus for manufacturing a plasma display device according to an embodiment of the present invention.

As shown in FIG. 5, at step S510, the ECU 450 moves the chassis base holder 420 to a predetermined position. The predetermined position may be preset to a position at which the optical sensor 440 may detect the aligning marks 111-114 and 121-124 through the penetration holes 151-154.

Subsequently at step S520, the ECU 450 determines on the basis of a signal from the optical sensor 440, whether the aligning marks 111-114 and 121-124 are detected through the penetration holes 151-154.

If the aligning marks 111-114 and 121-124 are not detected by the optical sensor 440 at the step S520, the step S510 is recursively executed until the aligning marks are detected.

When the aligning marks 111-114 and 121-124 are detected, the ECU 450 adjusts a position of the chassis base holder 420 at step S530 such that the aligning marks 111-114 and 121-124 are positioned at predetermined positions relative to the penetration holes 151-154.

During step S530, the ECU 450 determines at step S535 whether the aligning marks 111-114 and 121-124 are entirely exposed through the penetration holes 151-154. When the aligning marks 111-114 and 121-124 are not entirely exposed through the penetration holes 151-154, the ECU 450 positions the chassis base holder 420 at step S540 to a position at which the aligning marks 111-114 and 121-124 are entirely exposed through the penetration holes 151-154.

Partial exposure of the aligning marks 111-114 and 121-124 through the penetration holes 151-154 implies that the aligning marks 111-114 and 121-124 are biased with respect to the penetration holes 151-154, since the penetration holes 151-154 are larger than the aligning marks 111-114 and 121-124. Therefore at the step S540, by moving the chassis base 150 to a direction in which the aligning marks 111-114 and 121-124 are biased, the position of the chassis base 150 may be adjusted such that the aligning marks 111-114 and 121-124 are entirely exposed through the penetration holes 151-154.

Figure 6:
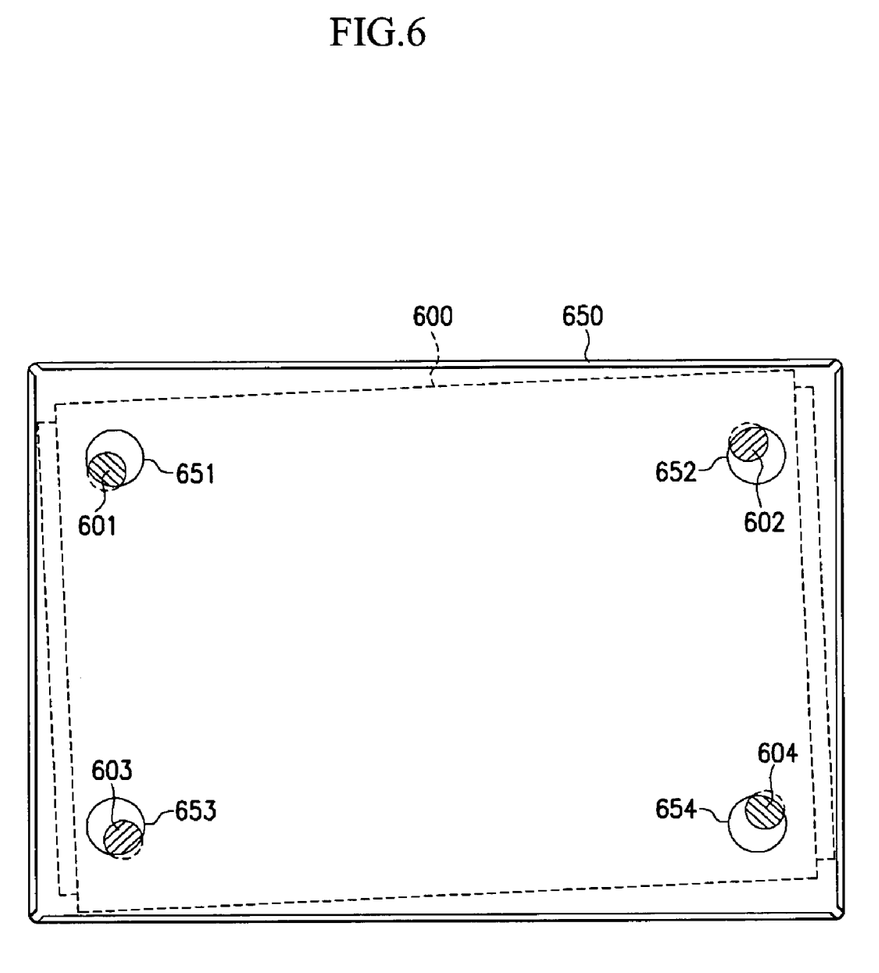
FIG. 6 illustrates an example of a misaligned of a PDP and a chassis base in a plasma display device.

FIG. 6 illustrates an example of misalignment of a PDP and a chassis base in a plasma display device. More specifically, FIG. 6 illustrates a situation in which the PDP 600 has become rotationally offset from the chassis base 650 in an counterclockwise direction by more than an allowable limit.

According to an embodiment of the present invention, combining the position of a chassis base and a PDP may be precisely controlled by using a penetration hole of the chassis base and an aligning mark of the PDP. Therefore, production of a plasma display device having a misalignment as shown in FIG. 6 may be prevented.

Even if such a misaligned plasma display device is produced or if a misalignment between the chassis base 650 and the PDP 600 of a plasma display device occurs after the plasma display device is produced, such a misalignment may be easily determined by visual inspection of aligning marks 601, 602, 603, and 604 through penetration holes 651, 652, 653, and 654.

Since penetration holes of a chassis base may be formed without an additional step when the chassis base is manufactured, production efficiency of a plasma display device may be maintained.

Having a plurality of aligning marks and penetration holes enables rotational alignment of a chassis base and a PDP without question of linear alignment thereof.

By forming a penetration hole larger than an aligning mark, determination of a misalignment may be simplified. In addition, determination of a misalignment is further simplified by a criterion of misalignment preset such as whether an aligning mark is entirely exposed through a penetration hole.

By forming circular penetration holes and an aligning marks, alignment may become precise in any direction.

Since aligning marks of upper and lower panels may also be used for aligning a PDP and a chassis base, additional processes and/or requirements required for the present invention may be minimized.

According to an apparatus for manufacturing a plasma display device of an embodiment of the present invention, efficient production of a plasma display device having a precise alignment of a PDP and a chassis base may be enabled by adjusting a relative position of a chassis base and a PDP on the basis of a signal from a sensor for detecting an aligning mark through a penetration hole.

While this invention has been described in connection with what is presently considered to be exemplary embodiments, it is to be understood that the invention is not limited to the disclosed embodiments, but, on the contrary, is intended to cover various modifications and equivalent arrangements included within the spirit and scope of the appended claims.

What is claimed is:

1. A display device comprising:
a display panel including an upper panel marked with at least one upper aligning mark and a lower panel having a first planar surface marked with at least one lower aligning mark; and
a chassis base for supporting the display panel, the chassis base including a second planar surface having at least one penetration hole, wherein the second planar surface of the chassis base entirely covers the first planar surface of the display panel except for the penetration hole, and wherein the chassis base exposes at least part of the at least one lower aligning mark through a respective one of the at least one penetration hole.

2. The display device of claim 1, wherein there are at least two upper aligning marks, at least two lower aligning marks and at least two penetration holes.

3. The display device of claim 1, wherein the at least one penetration hole is larger than the at least one upper aligning mark or the at least one lower aligning mark.

4. The display device of claim 3, wherein the chassis base entirely exposes the at least one lower aligning mark through the at least one penetration hole.

5. The display device of claim 1, wherein the at least one penetration hole, the at least one upper aligning mark and the at least one lower aligning mark are circular.

6. The display device of claim 1, wherein:
the upper panel and the lower panel are adhered such that the at least one upper aligning mark and the at least one lower aligning mark coincide.

7. The display device of claim 2, 3, 4 or 5 wherein:
the upper panel and the lower panel are adhered such that the at least one upper aligning mark and the at least one lower aligning mark coincide.

8. The display device of claim 1, wherein the display panel is a plasma display panel.

9. A plasma display device comprising:
a chassis base having a first side and a second side;
a plasma display panel including an upper panel and a lower panel adapted to display images through plasma discharge, the lower panel attached to the first side;
a heat conducting medium between the chassis base and the plasma display panel;
a fixing element combining the plasma display panel and the chassis base; and
one or more circuit board assemblies mounted to the second planar surface for driving the plasma display panel;
wherein at least one of the upper panel and the lower panel of the plasma display panel has at least one aligning mark;
wherein the chassis base includes at least one penetration hole adjacent the lower panel such that the chassis base exposes at least part of the at least one aligning mark through a respective one of the at least one penetration hole;
wherein the fixing element contacts the first side of the chassis base and the plasma display panel, the fixing element being proximate to the at least one aligning mark; and
wherein the first side of the chassis base entirely covers the lower panel except for the penetration hole.

10. The plasma display device of claim 9, further comprising at least two aligning marks and at least two penetration holes.

11. The plasma display device of claim 9, wherein the at least one penetration hole has an area larger than an area of the at least one aligning mark.

12. The plasma display device of claim 11, wherein the chassis base entirely exposes the at least one aligning mark through the at least one penetration hole.

13. The plasma display device of claim 9, wherein the at least one penetration hole and the at least one aligning mark are circular.

14. The plasma display device of claim 9, wherein the upper panel has at least one upper aligning mark; the lower panel has at least one lower aligning mark; and wherein the at least one upper aligning mark and the at least one lower aligning mark are aligned.

15. The plasma display device of claim 9, wherein the fixing element is adhesive tape.

16. A display device comprising:
a display panel including an upper panel and a lower panel, at least one of the upper panel or the lower panel marked with at least one aligning mark;
a chassis base including a first side, a second side, and at least one penetration hole adjacent the lower panel, wherein the lower panel is attached to the first side; and
a fixing element combining the display panel and the chassis base, the fixing element contacting the first side of the chassis base and the display panel and being proximate to the at least one aligning mark;
wherein at least part of the at least one aligning mark is exposed through a respective one of the at least one penetration hole; and
wherein the first side of the chassis base entirely covers the lower panel except for the penetration hole.

17. The display device of claim 16, further comprising at least two aligning marks and at least two penetration holes.

18. The device of claim 16, wherein the at least one penetration hole has a larger area than an area of the at least one aligning mark.

19. The device of claim 18, wherein the chassis base entirely exposes the at least one aligning mark through the at least one penetration hole.

20. The device of claim 16, wherein the at least one penetration hole and the at least one aligning mark are circular.

21. The display device of claim 16, wherein: the upper panel is marked with at least one upper aligning mark; the lower panel is marked with at least one lower aligning mark; and the at least one upper aligning mark and the at least one lower aligning marks are aligned.

22. The display device of claim 16, wherein the fixing element is adhesive tape.

* * * * *